(12) United States Patent
Yuyitung et al.

(10) Patent No.: US 8,065,256 B2
(45) Date of Patent: Nov. 22, 2011

(54) SYSTEM AND METHOD FOR DETECTING SYSTEM RELATIONSHIPS BY CORRELATING SYSTEM WORKLOAD ACTIVITY LEVELS

(75) Inventors: Tom Silangan Yuyitung, Toronto (CA); Andrew Derek Hillier, Toronto (CA)

(73) Assignee: Cirba Inc., Richmond Hill (CA)

( * ) Notice: Subject to any disclaimer, the term of this patent is extended or adjusted under 35 U.S.C. 154(b) by 0 days.

(21) Appl. No.: 12/890,273

(22) Filed: Sep. 24, 2010

(65) Prior Publication Data

US 2011/0078102 A1    Mar. 31, 2011

Related U.S. Application Data

(63) Continuation of application No. PCT/CA2009/000387, filed on Mar. 27, 2009.

(60) Provisional application No. 61/039,972, filed on Mar. 27, 2008.

(51) Int. Cl.
*G06F 17/00* (2006.01)
*G06N 5/02* (2006.01)
(52) U.S. Cl. ........................................................ 706/46
(58) Field of Classification Search ...................... 706/46
See application file for complete search history.

(56) References Cited

U.S. PATENT DOCUMENTS

| 2003/0009507 | A1 | 1/2003 | Shum |
| 2006/0161648 | A1* | 7/2006 | Ding et al. ..................... 709/224 |
| 2007/0016687 | A1 | 1/2007 | Agarwal et al. |
| 2007/0039132 | A1 | 2/2007 | Jung et al. |
| 2007/0168154 | A1* | 7/2007 | Ericson .......................... 702/179 |

OTHER PUBLICATIONS

Wandeler, E ; Thiele. L; "Characterizing Work Load Correlations in Multi Processor Hard Real-Time Systems"; Proceedings of the 11th IEEE Real Time and Embedded Technology and Applications Symposium (RTAS '05); Mar. 7 to 10, 2005; pp. 46 to 55.
Fortin, J; Search Report from International PCT Application No. PCT/CA2009/000387; search completed Jul. 30, 2009.

* cited by examiner

*Primary Examiner* — Jeffrey A Gaffin
*Assistant Examiner* — Vincent Gonzales
(74) *Attorney, Agent, or Firm* — Brett J. Slaney; Blake, Oassels & Graydon LLP

(57) ABSTRACT

Relationships between systems can be inferred through a correlation analysis of the system workload activity levels. A method, computer readable medium and system are provided for analyzing correlations between the system workloads. The method comprises obtaining a set of quantile-based workload data pertaining to a plurality of systems. The correlation coefficient limit may then be used to compute the workload correlation scores for the plurality of systems and a result indicative of relationships between the systems then provided.

16 Claims, 10 Drawing Sheets

SYSTEM AND METHOD FOR DETECTING SYSTEM RELATIONSHIPS BY CORRELATING SYSTEM WORKLOAD ACTIVITY LEVELS

CROSS-REFERENCE TO RELATED APPLICATIONS

The present application is a continuation of PCT Application No. PCT/CA2009/000387 filed on Mar. 27, 2009 which claims priority from U.S. Provisional Application No. 61/039,972 filed on Mar. 27, 2008 both of which are incorporated herein by reference.

TECHNICAL FIELD

The following relates to systems and methods for detecting relationships between systems based on correlated system workload activity levels.

BACKGROUND

As organizations have become more reliant on computers for performing day to day activities, so too has the reliance on networks and information technology (IT) infrastructures increased. It is well known that large organizations utilize distributed computing systems connected locally over local area networks (LAN) and across the geographical areas through wide-area networks (WAN).

While the benefits of a distributed approach are numerous and well understood, there has arisen significant practical challenges in managing such environments. Decentralized control and decision making around capacity, the perception that the cost of adding systems is inexpensive, and the increased popularity of server virtualization technologies, have created environments comprised of a multitude of interconnected systems with excess capacity.

Too many servers result in extra costs, mostly through additional capital, maintenance and upgrade expenses; redundant software licenses; and excess heat production and power consumption. As such, removing even a modest number of servers from a large IT infrastructure can save a significant amount of cost on a yearly basis.

Organizations concerned with such redundancies need to determine how they can best achieve consolidation of capacity. In general, consolidating systems is a daunting task as there are many possible consolidation combinations with varying levels of benefits and risks.

To determine the most suitable consolidation solution, understanding dependencies and relationships between systems is critical. System and application dependencies are typically determined through non-empirical methods such as the inspection of detailed configuration and run-time settings of the systems and applications combined with domain knowledge of the computing environment.

SUMMARY

The following describes an empirical method for detecting relationships and dependencies between systems through the correlation of their respective workload activity levels. Such a method can supplement and validate the results obtained through non-empirical methods for finding system relationships and dependencies.

A method is provided that comprises the ability to detect and visualize relationships between systems and their applications based on a correlation analysis of the workload activity levels of the systems.

In addition, workload patterns of a specific system can be detected by applying the correlation analysis on the system's workload activity at different time periods.

Examples of system workloads that can be used to infer relationships include CPU utilization, memory utilization, disk I/O read and write rates, network send and receive rates, network latency, etc. The actual system workload values can take various forms. They can be based on various time bases including periodic time series data samples (e.g. 1 minute samples), summarized quantiles for a specific time periods (e.g. hourly), averaged values (e.g. hourly averages), etc.

System metrics can be correlated on an absolute or relative basis. Absolute correlations compare the raw data values to detect similarities in the absolute workload activity levels of the systems. Relative workload correlations compare dimensionless data values to detect similarities in the patterns of workload activity over time instead of comparing the absolute workload values.

In one aspect, there is provided a method for detecting relationships between systems based on correlations between system workloads, the method comprising: obtaining a set of quantile-based workload data pertaining to a plurality of systems; converting the quantile-based workload data to relative measures if appropriate; computing a correlation coefficient of workloads for a plurality of relevant system combinations; computing a correlation score using a correlation coefficient for each system combination; and providing analysis results in a correlation map.

In another aspect, a computer readable medium is provided comprising computer executable instructions for performing the method.

In yet another aspect, a system is provided which comprises a database, a processor, and the computer readable medium.

BRIEF DESCRIPTION OF THE DRAWINGS

An embodiment of the invention will now be described by way of example only with reference to the appended drawings wherein:

FIG. 7 is a screenshot of a user interface for specifying systems to be analyzed.

FIG. 9 is a screenshot of a user interface for specifying criteria in choosing desired workload data to extract for an analysis.

DETAILED DESCRIPTION OF THE DRAWINGS

The following describes an embodiment for detecting relationships between systems based on correlations in the workload activity levels of the respective systems. The methodology described below employs statistical models and scoring algorithms based on the specified limits. It may be noted that applications for models of system relationships include server consolidation and virtualization analysis, pro-active capacity management, capacity planning, problem troubleshooting and root cause analysis.

Figure 1:
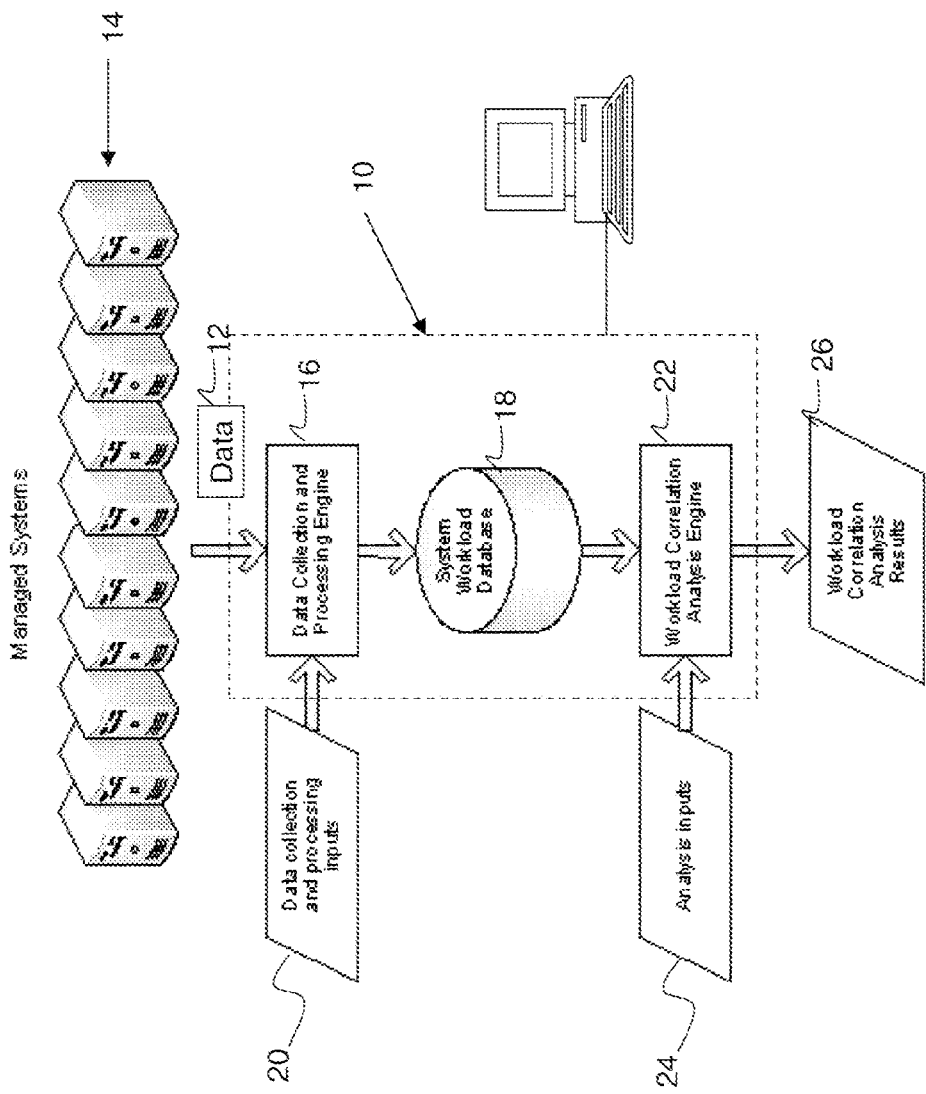
FIG. 1 is a block diagram illustrating a workload correlation analysis system.

Turning now to FIG. 1, a workload correlation analysis system for analyzing workload data obtained from one or more managed systems 14 is generally denoted by numeral 10 and in the example shown is implemented using a computer. It will be appreciated that a "system" 14 or "computer system" 14 hereinafter referred, can encompass any entity which is capable of being analysed based on any type of utilization data and should not be considered limited to existing, hypothetical, physical or virtual systems, etc.

The system 10 comprises a data collection and processing engine 16, which comprises software, hardware (e.g. soft or hard processor) or a combination thereof and is capable of obtaining data 12 from the managed systems 14 and store such data 12 in a system workload database 18. The collection of data can be controlled or otherwise assisted by using data collection and processing inputs 20 provided to the data collection and processing engine 16.

The system 10 also comprises a workload correlation analysis engine 16, which comprises software, hardware (e.g. soft or hard processor) or a combination thereof and is capable of obtaining the data 12 stored in the system workload database 18, process such data 12 while taking into account user analysis inputs 24 to generate workload correlation analysis results 26. It can be appreciated that the workload correlation analysis system 10 can be implemented as a remote service, locally running application, or in any other suitable configuration capable of applying the principles discussed herein.

Figure 2:
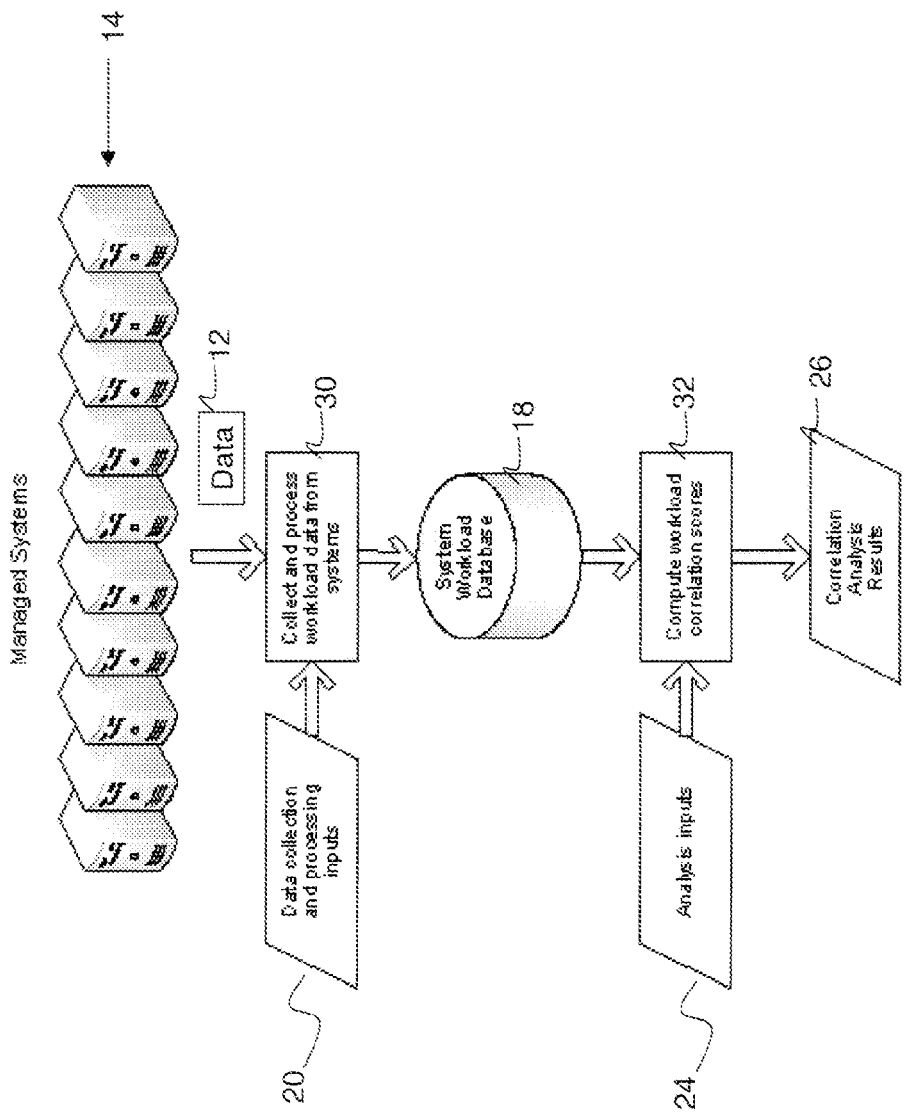
FIG. 2 is a flow diagram illustrating an exemplary procedure for performing a workload correlation analysis.

A high level data flow for the workload analysis system 10 is shown in FIG. 2. The workload data 12 is collected from the systems 14 and processed at step 30, before being stored in the system workload database 18. The workload data may have been obtained in advance or may be acquired in real time during the analysis. Data collection and processing inputs 20 are used in this example in order to facilitate the collection and processing of the workload data 12. A set of analysis inputs 24 are used in this example at step 32, in order to facilitate the computation of the workload correlation scores, which are used to generate the correlation analysis results 26.

Figure 3:
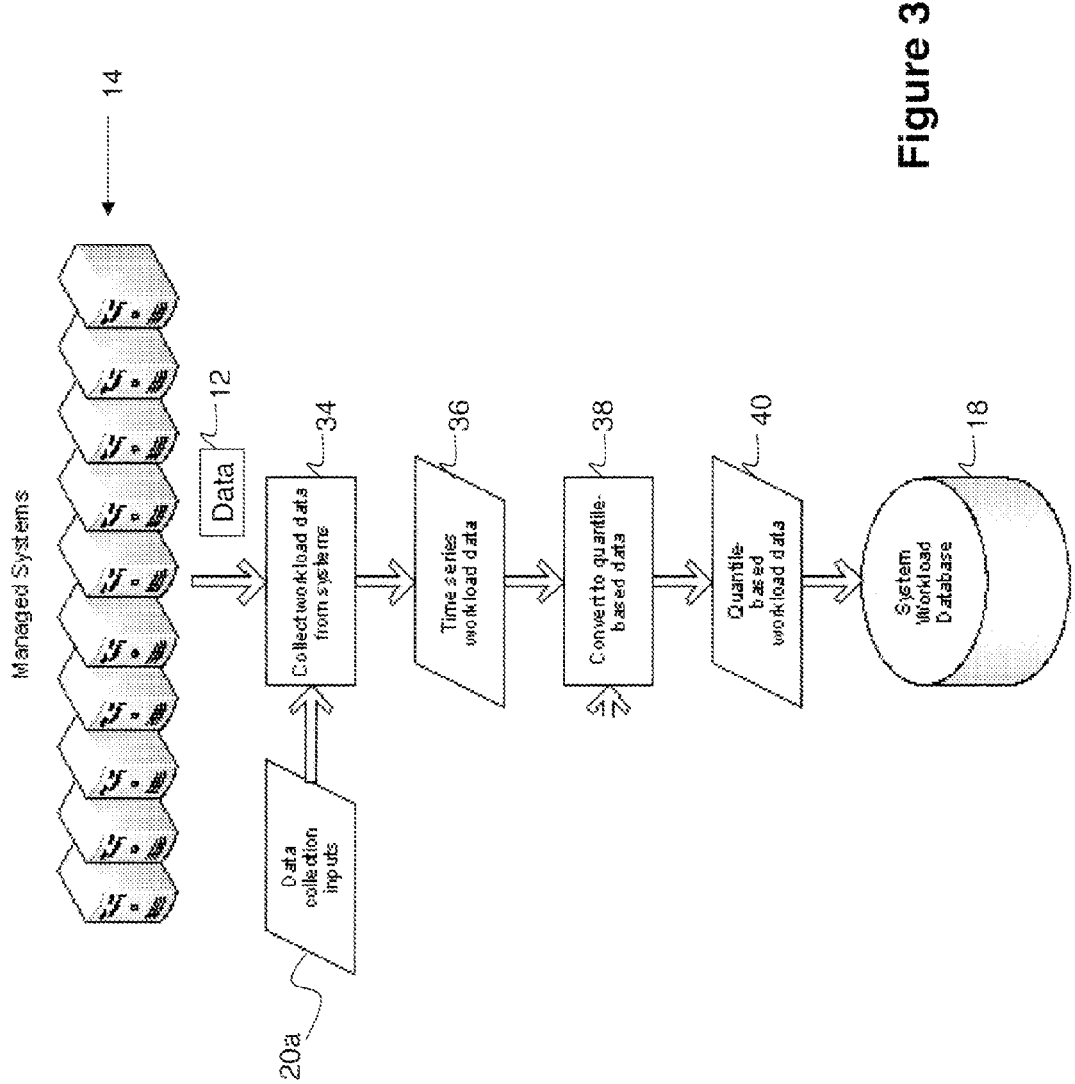
FIG. 3 is a flow diagram illustrating further detail concerning the collection and processing of workload data step shown in FIG. 1.

FIG. 3 provides further detail of an embodiment for collecting and processing workload data 12 at step 30 shown in FIG. 2. The workload data 12 is collected from the systems at step 34 based on data collection inputs 20a, which may include workload metrics (e.g. CPU utilization) to collect, and data sample frequency (e.g. every 5 minutes). This produces time series workload data 36. The collected time series workload data 36 is then converted to quantile based data 40 at step 38 using data processing inputs 20b such as quantile and time basis inputs (e.g. hourly minimum, $1^{st}$ quartile, median, $3^{rd}$ quartile, and maximum) to produce the quantile based data 40. It has been found that quantiles provide an effective technique for characterizing stochastic data. It may be noted that the quantile and time basis inputs 20b are typically dependent on the nature of the time series workload data, e.g. frequency of time series, etc. The quantile based workload data 40 is then stored in the system workload database 18 for subsequent processing, details of which are exemplified in FIG. 4.

Figure 4:
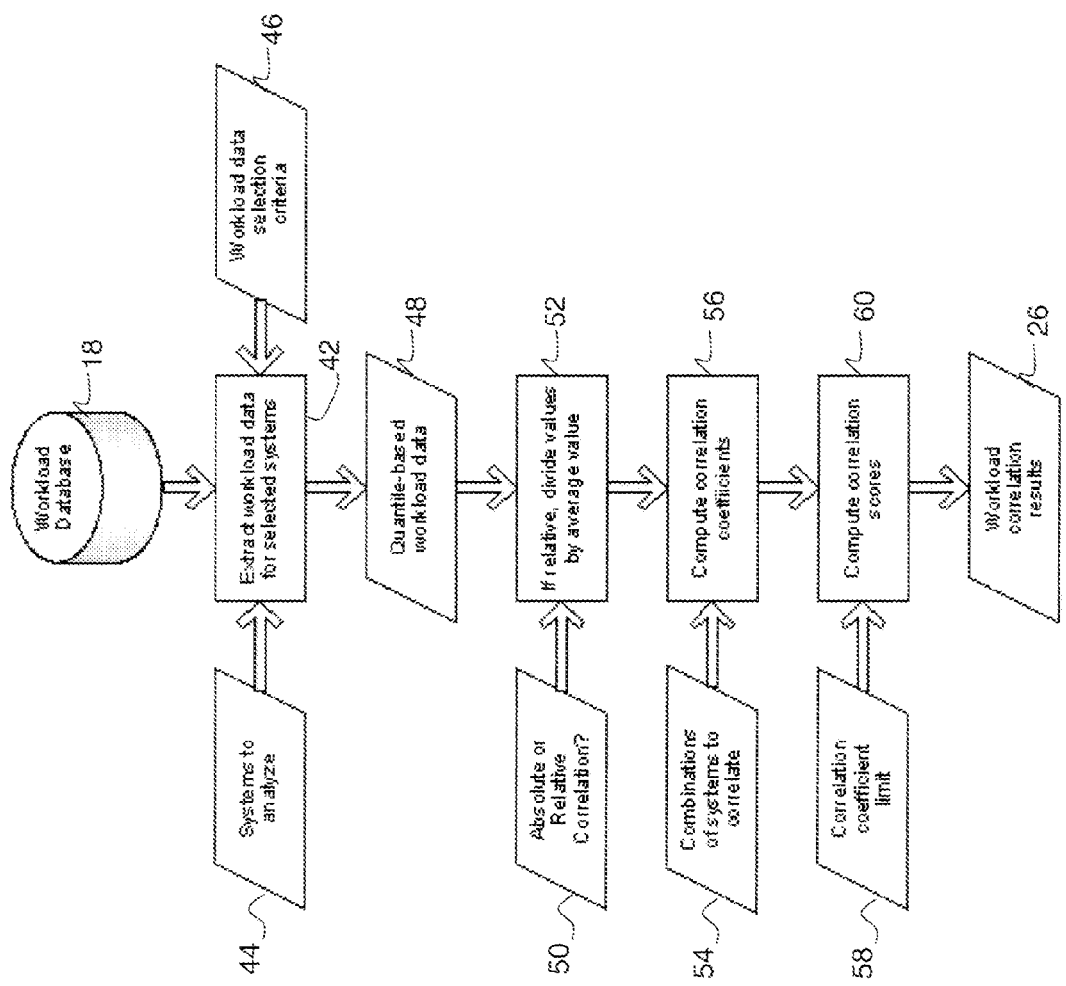
FIG. 4 is a flow diagram illustrating further detail concerning the workload correlation computation shown in FIG. 1.

Turning to FIG. 4, upon initiating a new correlation analysis for a selected set of one or more systems 14 using the workload correlation analysis engine 22, the workload data 12 for the selected systems 14 is extracted from the system workload database 18 at step 42, based on input regarding the systems to analyze 44 and workload data selection criteria 46. The workload data selection criteria 46 define how to choose the actual data to be used in the assessment for each system 14. The criteria include the specific workload metrics to be analyzed (e.g. CPU utilization, disk I/O activity, network I/O activity, etc.), a date range specifying the time period from which to select historical data, and additional specification for choosing what comprises the representative data (e.g. busiest, least busy, typical, average, etc.).

Upon extracting the workload data 12 as exemplified above, a representative set of quantile-based workload data 48 over the chosen time period is obtained for each system 14 in the analysis. If the correlation is to be performed on a relative basis as determined through an appropriate input 50, the workload data values for each system 14 are divided by their corresponding average value at step 52. If the correlation is to be performed on an absolute basis, the workload values would be unchanged.

Based on the specified combinations of the systems to be correlated 54, the correlation coefficients are computed at step 56, for each specified combination. Typically, the combinations to be analyzed include each system 14 against each of the other systems 14 on a 1-to-1 basis. Alternatively, it is also possible to analyze the correlation of a selected group of systems 14 (i.e. N-by-N).

Based on the correlation coefficient limit specified at 58, the workload correlation score for each specified system combination can be computed at step 60. The workload correlation scores are then sorted and displayed in the correlation map, which may be provided as or included with the workload correlation results 26.

As will be explained in greater detail below, system relationships can be inferred by correlating system workload activity levels.

Quantile-Based Workload Data

Once the representative quantile-based workload data 40 is extracted for the systems 14 to be analyzed, the correlation analysis can begin. In the following discussion, it is assumed that the workload data 12 for each system 14 is modeled as a single day of hourly quartiles (i.e. minimum, $1^{st}$ quartile, median, $3^{rd}$ quartile and maximum for each hour) and averages. Therefore, there are 144 (i.e. 24×6) workload data values for each system 14, for each day. It will be appreciated that this is merely one example and the principles described herein are applicable to any suitable quantile.

Absolute vs. Relative Workload Correlation

Users can choose to perform an absolute or relative workload correlation analysis. If the user chooses to perform a relative correlation analysis, the workload data values are converted to represent relative changes of the workload activity levels over the selected time period. For example, for each system 14, the maximum value for each of the 24 hours can be divided by the average of all the maximum values over the 24 hours. The same conversion can be performed for the other hourly values (i.e. minimum, $1^{st}$ quartile, median, $3^{rd}$ quartile and average).

$$y_i = \frac{x_i}{\bar{x}};$$

Where:
$x_i$ is the $i^{th}$ data value instance (e.g. maximum value per hour, i=24);
$\bar{x}$ is the average of the data values (e.g. average maximum for 24 hours); and
$y_i$ is the $i^{th}$ data instance in relative terms (e.g. relative maximum value per hour).

By converting the absolute workload values to relative values, the analysis can correlate relative changes in workload activity levels between systems 14. For example, consider 2 systems: system A and B. System A's daily average memory utilization is 100 MB and peaks at 200 MB at 9 AM. System B's daily average memory utilization is 200 MB and peaks at 400 MB at 9 AM. Based on the relative correlation analysis, the systems are highly correlated since their memory utilization levels double at 9 AM. Conversely, based on an absolute correlation analysis, the systems are not correlated since the differences between the absolute workload values are significant.

Workload Correlation Coefficients

The correlation of the workload activity levels of a set of systems 14 can be measured by computing the correlation coefficient.

In general, the correlation of system metrics can be measured by computing the dispersion of the data values. The smaller the dispersion, the more correlated the data set. A common measure for data correlation is the standard deviation.

The standard deviation, $\sigma$ (or root mean squared error) for a data set is computed as follows:

$$\sigma = \sqrt{\frac{\sum_i^n (x_i - \bar{x})^2}{n}} ;$$

Where:
$x_i$ is the $i^{th}$ data value instance;
$\bar{x}$ is the average of the data values; and
n is the number of data values.

The standard deviation measures the differences between the actual values and the average data value. Dividing the error by the number of data values, n, yields an error value that is of the same dimensionality as the original data values. The smaller the standard deviation, the more correlated the data.

To compare the relative correlation of data sets, the standard deviation is normalized. The standard deviation can be made dimensionless by dividing the value by the mean. Furthermore, to ensure the resulting value ranges between 0 and 100, it may then be multiplied by 100 and divided by square root of the number of samples.

The correlation coefficient, C can be computed as follows:

$$C = \frac{100}{N * \bar{x}} \sqrt{\sum_n^N (x_n - \bar{x})^2} ;$$

Where:
$x_n$ is the $n^{th}$ data value instance (e.g. data value per system);
$\bar{x}$ is the average of the data values (e.g. average data value for all systems); and
N is the number of data values (e.g. number of systems).

If the average of the data values, $\bar{x}$ is 0, assume the correlation coefficient is 100.

The correlation coefficient is a normalized measure of the diversity of a data set. The correlation coefficient ranges between 0 and 100. The smaller the correlation coefficient, the more correlated the data set.

The correlation analysis can be applied to time series data. This is useful when assessing system metrics that vary over time. If the workload activity levels of multiple systems 14 are correlated over time, one may infer that the systems 14 share common environmental factors or dependencies.

For instance, given the average hourly CPU utilization of multiple systems 14 for a 24 hour period, one can compute 24 correlation coefficients for each hour under consideration. The hourly results can be combined to produce of an overall measure of the correlation for the 24 hour period.

The overall correlation coefficient based multiple time samples may be computed as follows:

$$C = \frac{100}{T * N * \bar{x}} \sum_t^T \sqrt{\sum_n^N (x_{t,n} - \bar{x}_t)^2} ;$$

Where:
C is the correlation coefficient for the time period;
N is the number of systems being analyzed;
n is the $n^{th}$ system;
$x_{t,n}$ is the data sample for the $n^{th}$ system at time sample t;
$\bar{x}_t$ is the average data value for all the systems at time sample t;
$\bar{x}$ is the overall average value for all the systems for all the time samples;
T is the total number of time samples analyzed (e.g. 24 hourly data samples); and
t is the $t^{th}$ time series data sample (e.g. 0, 1, 2, 3, . . . , 23).

If the average of the data values, $\bar{x}$ is 0, assume the correlation coefficient is 100.

The correlation analysis can also be applied to time series data comprised of time-based quantiles (e.g. hourly minimum, $1^{st}$ quartile, median, $3^{rd}$ quartile, and maximum values). As discussed earlier, these quantile-based values provide a descriptive and compact data representation of time series data.

The correlation coefficients for multiple systems 14 can be computed for a set of statistics and multiple time samples. For each time sample, the coefficients for multiple statistics can be combined as a weighted average. To reflect the relative significance of the median, quartiles, minimum and maximum values, possible weighting factors may be:
Minimum: 0.1
$1^{st}$ Quartile: 0.2
Median: 0.4
$3^{rd}$ Quartile: 0.2
Maximum: 0.1

The sum of the weighting factors is 1.0 to ensure that the final result remains as a normalized value between 0 and 100. The correlation coefficient for a set of systems for multiple time samples and multiple statistics may be computed as follows:

$$C = \frac{100}{T * N * \bar{x}} \sum_t^T \sum_s^S \left[ w_s * \sqrt{\sum_n^N (x_{t,s,n} - \bar{x}_{t,s})^2} \right];$$

Where:
C is the correlation coefficient;
N is the number of systems being analyzed;
T is the total number of time samples;
S is the total number of statistical data values (e.g. minimum, $1^{st}$ quartile, median, $3^{rd}$ quartile, maximum);
$x_{t,s,n}$ is the data sample for the $n^{th}$ system for statistic s at time sample t;

$\bar{x}_{t,s}$ is the average data value for the N systems for statistic s at time sample t;

$\bar{x}$ is the overall average value for all the systems for all the statistics and time samples;

$w_s$ is the weighting factor for combining the statistics;

n is the $n^{th}$ system;

s is the $s^{th}$ statistic data value; and t is the $t^{th}$ time series data sample.

If the average of the data values, $\bar{x}$ is 0, assume the correlation coefficient is 100.

Note that the sum of the quantile weights is 1 so that the correlation coefficient does not need to be divided by the number of quantiles (e.g. 5 if quantiles consist of minimum, $1^{st}$ quartile, median, $3^{rd}$ quartile and maximum).

Workload Correlation Scores

A correlation score can be calculated from the correlation coefficient and a user-defined correlation coefficient limit. Like the correlation coefficient, the limit ranges between 0 and 100. The resulting correlation score also ranges between 0 and 100, with larger scores indicating greater correlation. Scores provide an intuitive and quantized measure of the degree of correlation of the analyzed systems.

If the coefficient value is less than or equal to the limit, a score of 100 is assigned. If the coefficient is greater than or equal to twice the limit, the score is 0. If the coefficient value is between the limit and twice the limit, the score is estimated based on the ratio of the difference between the value and the limit.

$$S = 100 * \left(1 - \frac{C-L}{L}\right);$$

Where:

S is the correlation score;

C is the correlation coefficient (between the limit and twice the limit); and

L is the user-specified limit (where the limit is greater than 0).

If the limit is 0, the score is simply 100 minus the correlation coefficient.

The correlation analysis can be applied to a collection of systems 14 by evaluating the systems 14 on a one-to-one basis. System pairs with similar correlation results can be grouped together to infer relationships or similarities between groups of systems. The correlation results can be depicted in a grid or map where each cell represents the correlation score between a pair of systems.

The correlation analysis can also be applied to a collection of systems 14 by evaluating more than two systems 14 as a group. Just as with the system pairs, the correlation coefficient and correlation score can be calculated for each defined group of systems 14.

Correlation Maps

A set of systems can be analyzed on a one-to-one basis to determine which pairs of systems 14 are most correlated with respect to the selected system metric. Furthermore, systems 14 can be grouped according to how similarly they are correlated against other systems 14. That is, systems 14 that are highly correlated against each other may be thought to be collectively correlated. The results of such an analysis can be presented in a grid where the systems 14 are listed as rows and columns. Each cell in the grid may comprise a number corresponding to a correlation score. The cells may also be color coded to provide a visual indication of the extent of correlation and to allow easier correspondence with other similar scores. If the grid is sorted so that systems 14 with the most similar correlation scores are adjacent, systems 14 with common characteristics with respect to the analyzed metric should be grouped together.

Figure 5:
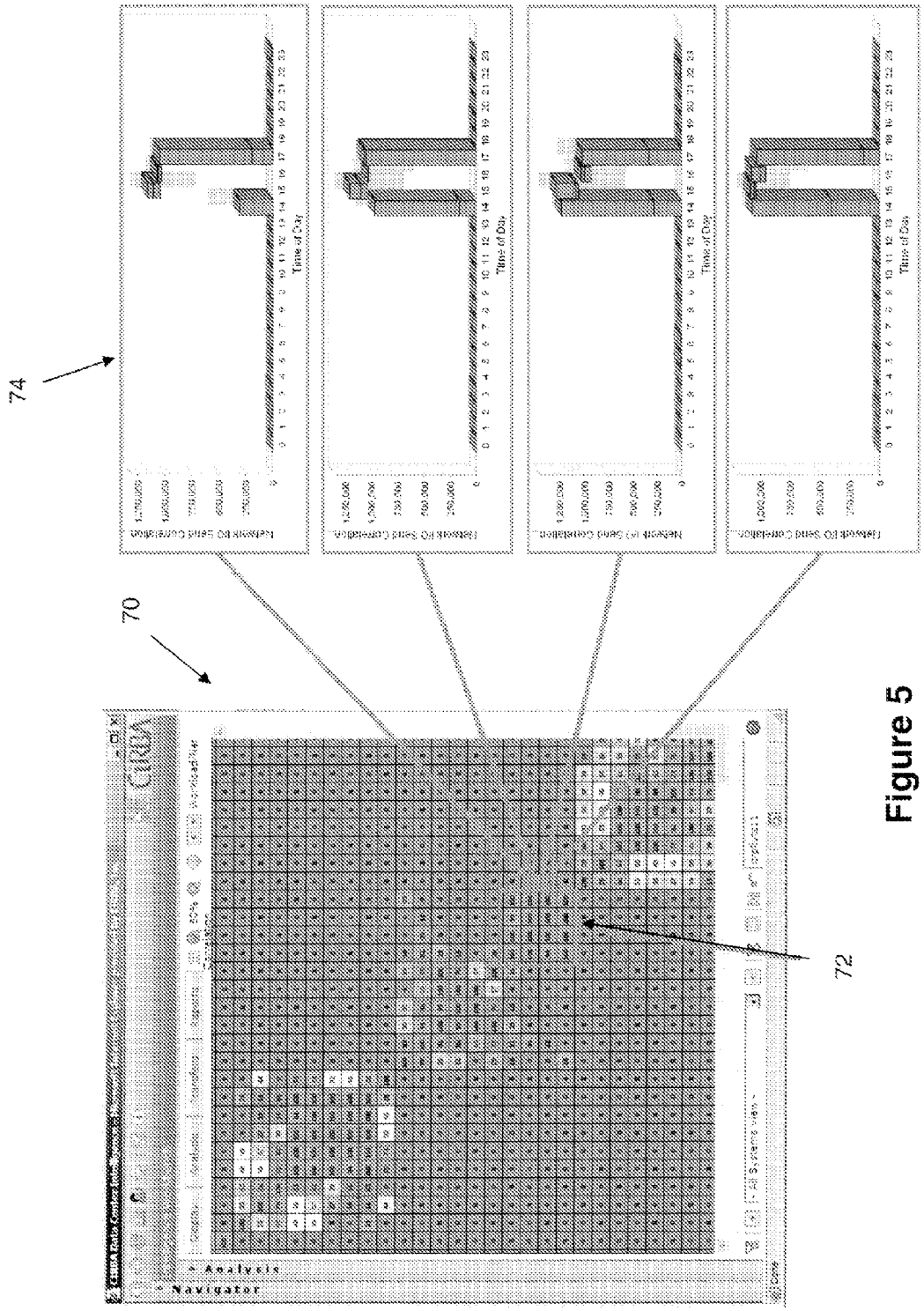
FIG. 5 is a sample of a workload correlation analysis map and a set of correlated workload charts.

FIG. 5 depicts a correlation analysis map 70 analyzing the network send activity between a set of systems 14 on a one-to-one basis. The correlation analysis map shown in FIG. 5 is comprised of four distinct groups of systems. Within each group, the systems have correlated levels of network send activity. In particular, one of the groups 72 contains four systems, each with similar workload charts 74 corresponding to the systems in the group.

Example Workload Correlation Analysis

In the following example, the absolute correlation of the CPU utilization of a set of systems is analyzed on a 1-to-1 basis. Instead of considering multiple workload data values per system (i.e. hourly minimum, $1^{st}$ quartile, median, $3^{rd}$ quartile, maximum and average values), this example considers only a single data value per system to provide a simplified explanation of a correlation analysis.

The following table lists the % CPU utilization for 4 systems.

TABLE 1

% CPU Utilization Sample Data

| System | % CPU |
|--------|-------|
| S1 | 4 |
| S2 | 5 |
| S3 | 24 |
| S4 | 25 |

The correlation analysis can be performed for each possible combination of system pairs. The resulting correlation coefficients for each combination of system pairs, which can be computed according to the above methodology, are listed in the table below.

TABLE 2

Correlation Coefficients for Sample Data

| System Pair | Value 1 | Value 2 | Correlation Coefficient |
|-------------|---------|---------|-------------------------|
| S1 - S2 | 4 | 5 | 7.9 |
| S1 - S3 | 4 | 24 | 50.5 |
| S1 - S4 | 4 | 25 | 51.2 |
| S2 - S3 | 5 | 24 | 46.3 |
| S2 - S4 | 5 | 25 | 47.1 |
| S3 - S4 | 24 | 25 | 1.4 |

The system pairs with similar values (S1-S2 and S3-S4) have the lowest correlation coefficients of 7.9 and 1.4, respectively. Conversely, other pairs of systems have significantly higher correlation coefficients, ranging from 46.3 to 51.2.

Assuming a correlation coefficient limit of 20, the corresponding correlation scores for each system pair are shown below.

TABLE 3

Correlation Scores for Sample Data

| System Pair | Correlation Coefficient | Correlation Score |
|-------------|-------------------------|-------------------|
| S1 - S2 | 7.9 | 100 |
| S1 - S3 | 50.5 | 0 |

TABLE 3-continued

Correlation Scores for Sample Data

| System Pair | Correlation Coefficient | Correlation Score |
|---|---|---|
| S1 - S4 | 51.2 | 0 |
| S2 - S3 | 46.3 | 0 |
| S2 - S4 | 47.1 | 0 |
| S3 - S4 | 1.4 | 100 |

When depicted in the correlation analysis map, systems S1 and S2 are grouped together by virtue of their 100 score with respect to each other and 0 score with respect to S3 and S4. Similarly, the systems S3 and S4 are also grouped together by virtue of their 100 score with respect to each other and 0 scores with respect to S1 and S2.

TABLE 4

Analysis Map for Sample Data

|  | S1 | S2 | S3 | S4 |
|---|---|---|---|---|
| S1 | 100 | 100 | 0 | 0 |
| S2 | 100 | 100 | 0 | 0 |
| S3 | 0 | 0 | 100 | 100 |
| S4 | 0 | 0 | 100 | 100 |

Example Correlation Analysis Program User Interface

In the following example, the process of performing a correlation analysis for a set of systems is described through an exemplary user interface employed by the analysis program.

Figure 6:
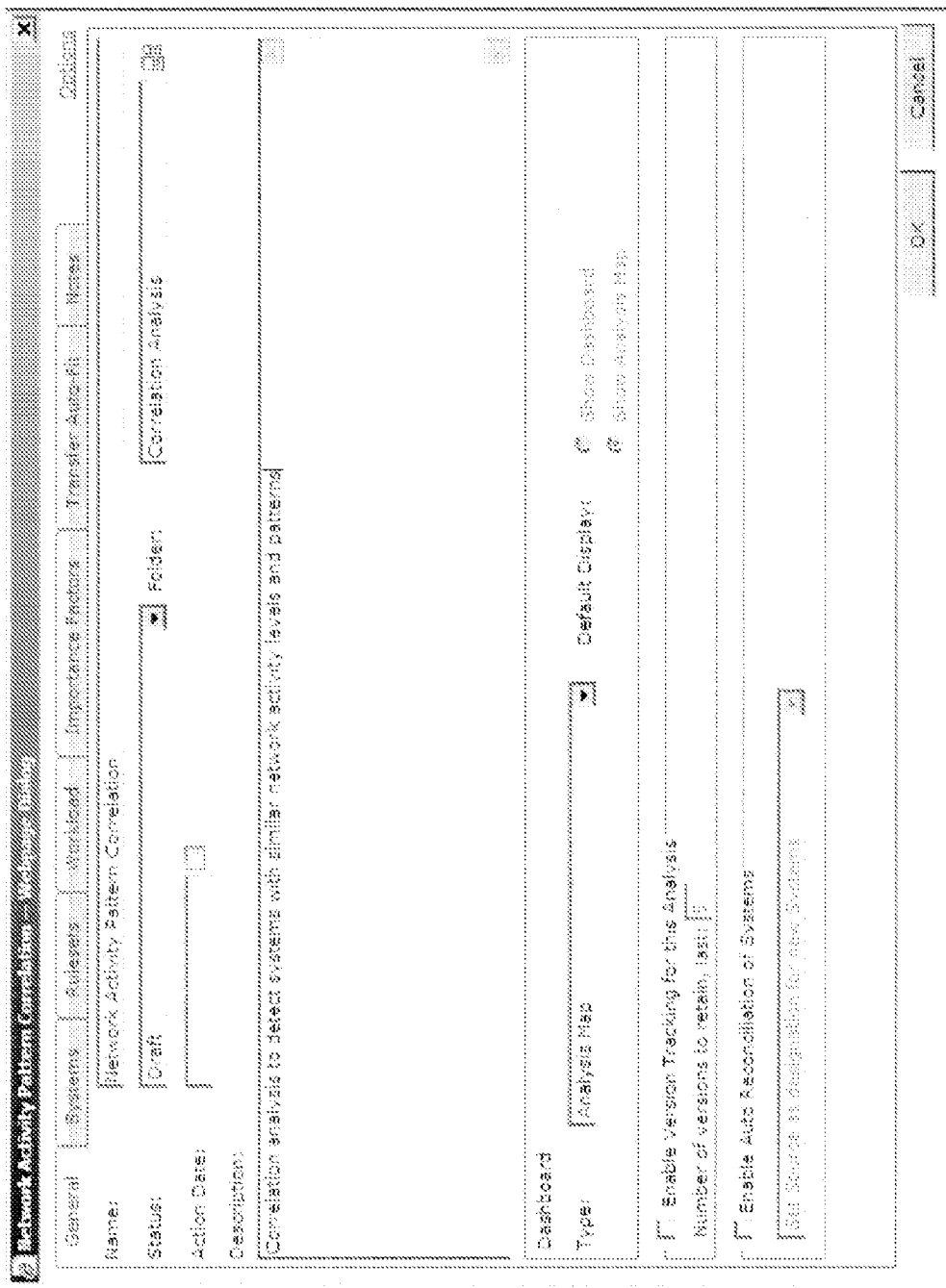
FIG. 6 is a screenshot of a user interface for specifying general analysis settings.

The first step involves creating and naming the analysis. FIG. 6 shows a user interface for specifying general analysis parameters. This includes such items as the analysis name, description, folder location and dashboard type.

Figure 7:
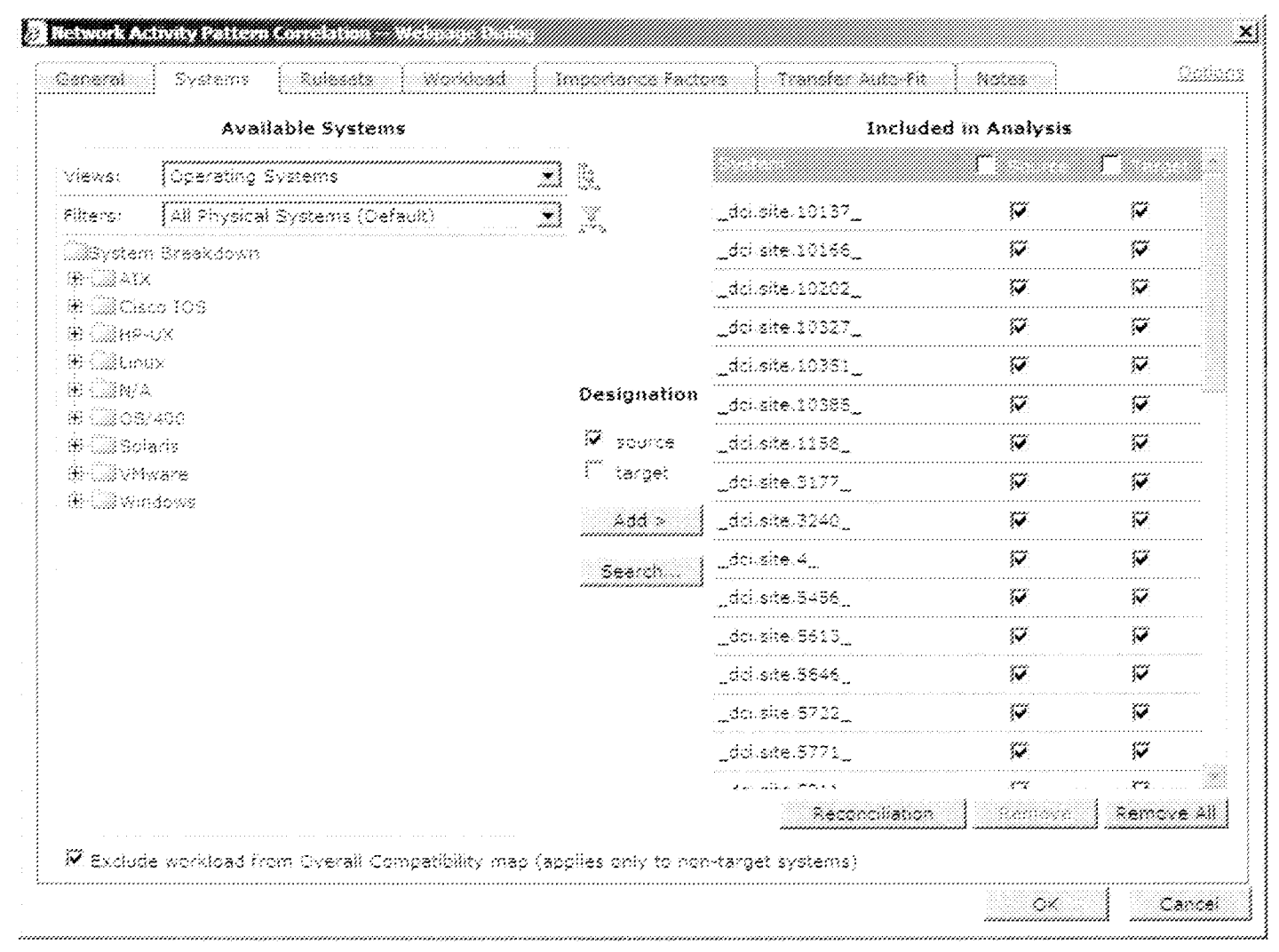

Next, the systems to be analyzed are selected. FIG. 7 shows a user interface for choosing the systems to be analyzed. The left hand of the side of the dialog lists the systems available for analysis. The right hand side of the dialog lists the systems to be analyzed.

Figure 8:
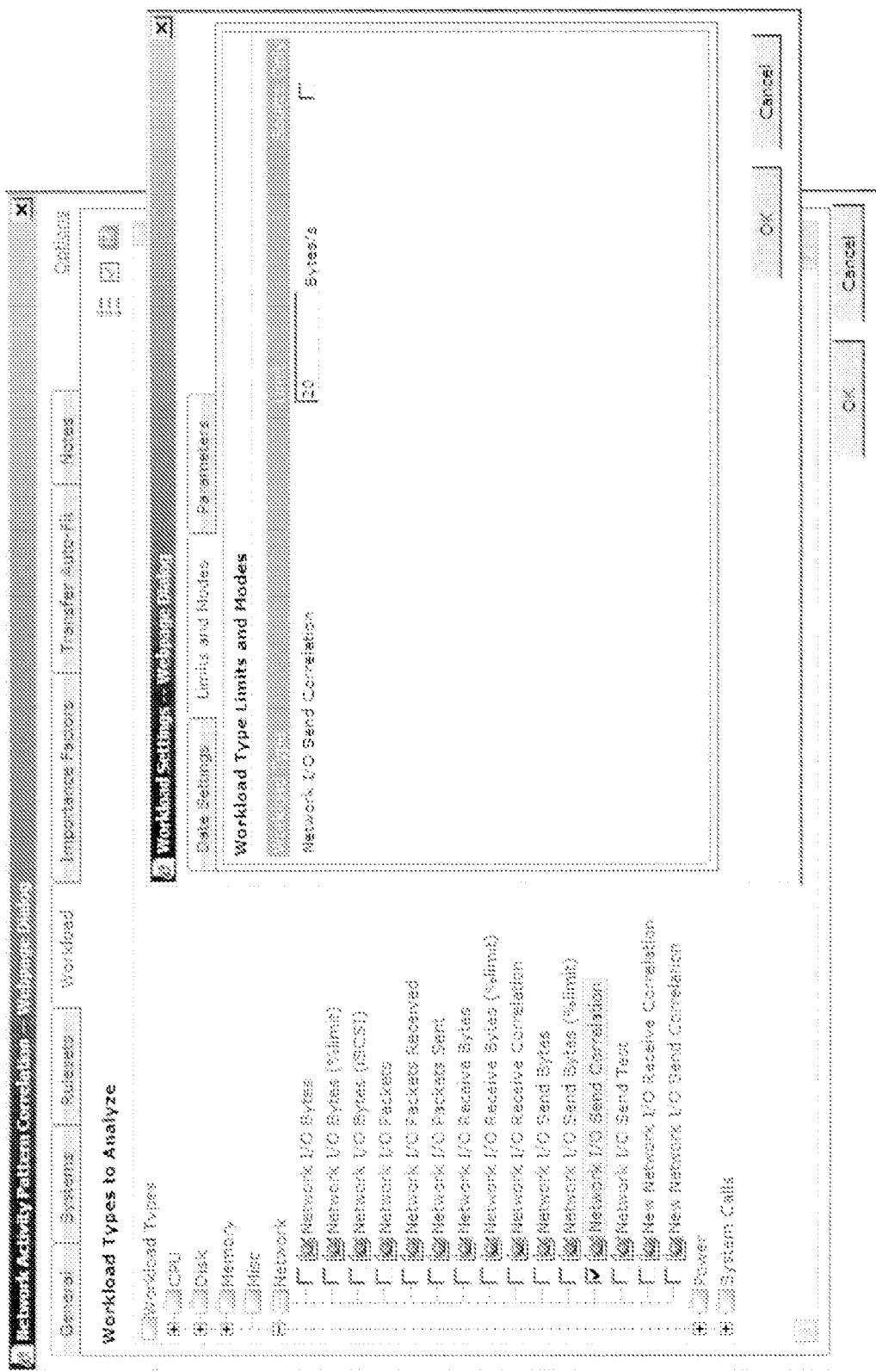
FIG. 8 is a screenshot of a user interface for specifying a workload type to analyze and the corresponding limit to apply for the analysis.

The workload type(s), correlation coefficient limit(s) and workload data selection criteria are then specified. FIG. 8 shows user interfaces for selecting the workload types to be analyzed and specifying the correlation coefficient limit. In this example, the Network I/O Send Correlation workload type is selected with a limit of 20.

Figure 9:
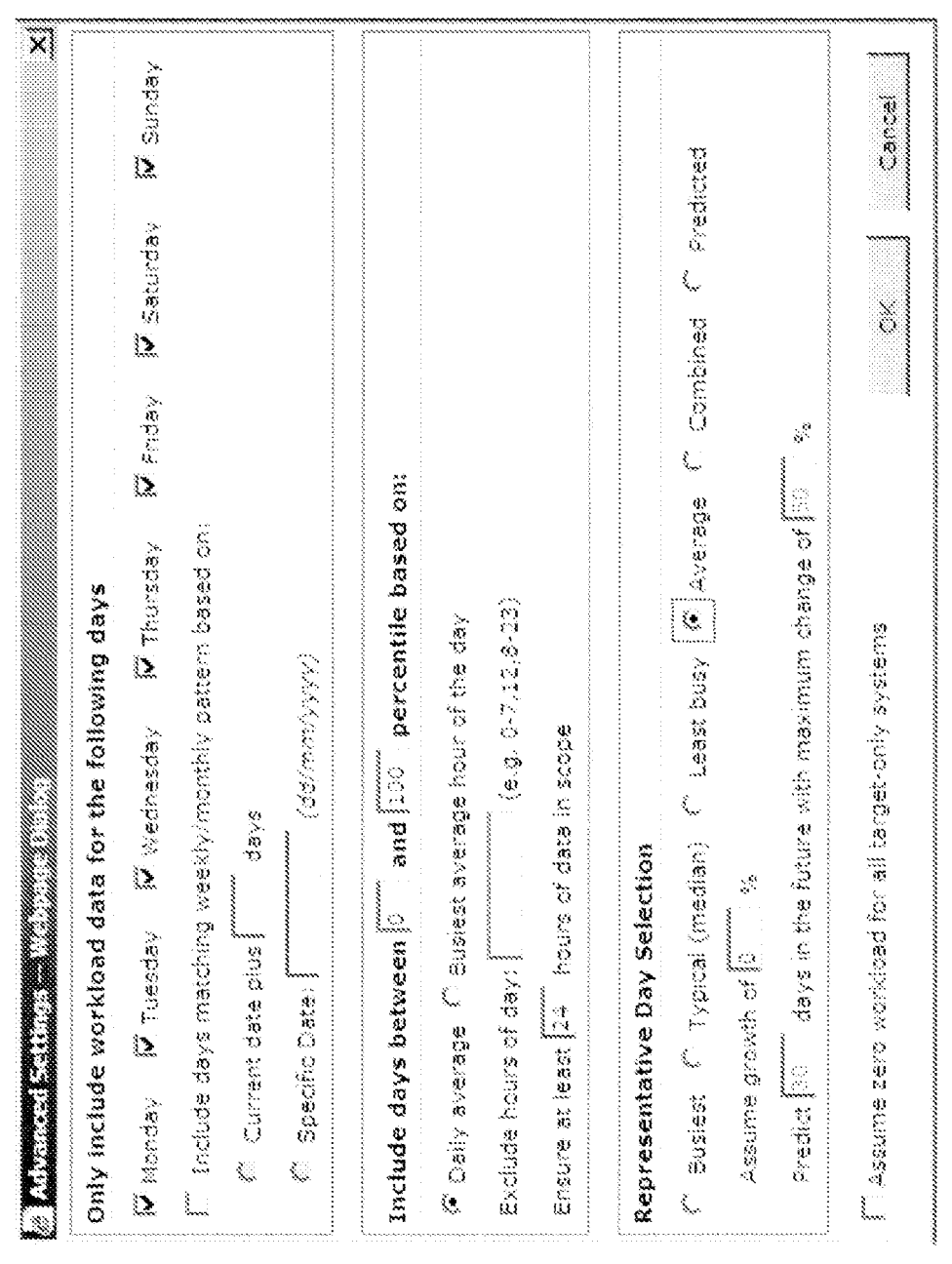

FIG. 9 shows user interfaces for specifying detailed criteria for defining the day of workload data to be extracted for the analysis for each system. Users can specify various criteria such as the day of the week, exclusion of days by percentile, selection of workload day based on busiest, typical, least busy, average, etc.

Figure 10:
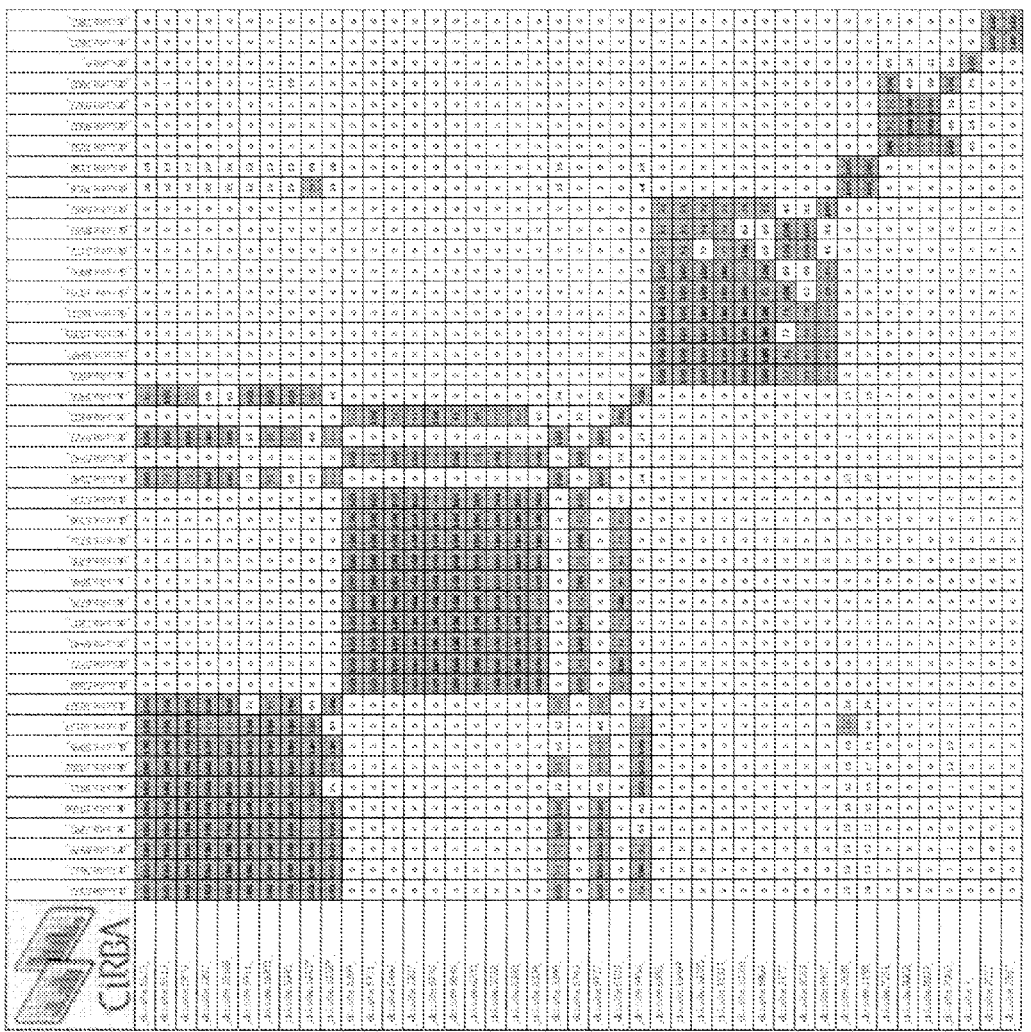
FIG. 10 is a sample screenshot of a correlation analysis map.

Finally, the systems can be analyzed, and the resulting correlation analysis map is shown in FIG. 10. In this map, the distinct regions represent systems with similar network send activity.

Accordingly, the correlation analysis results can be used to empirically detect and visualize common characteristics and relationships between systems. For instance, a network latency correlation analysis can detect which systems have common network environments. Similarly, a relative CPU utilization correlation analysis can detect which systems have possible dependencies or common modes. Awareness of such system relationships has immense value when managing and maintaining systems, consolidating and virtualizing systems, and troubleshooting problems.

Although the invention has been described with reference to certain specific embodiments, various modifications thereof will be apparent to those skilled in the art without departing from the spirit and scope of the invention as outlined in the claims appended hereto.

The invention claimed is:

1. A method for detecting relationships between systems based on correlations between system workloads, said method comprising:
   obtaining a set of quantile-based workload data pertaining to a plurality of systems;
   converting said quantile-based workload data to relative measures if appropriate;
   computing a correlation coefficient of workloads for a plurality of relevant system combinations;
   computing a correlation score using a correlation coefficient for each system combination; and
   providing analysis results in a correlation map.

2. The method according to claim 1 further comprising obtaining a set of time series workload data and converting said time series workload data into said quantile-based workload data.

3. The method according to claim 2 wherein said time series data is collected from said plurality of systems using data collection inputs.

4. The method according to claim 2 wherein said quantile-based workload data is converted according to quantile and time basis inputs.

5. The method according to claim 1 wherein said quantile-based workload data is selected for said plurality of systems from a stored set of quantile-based workload data according to workload data selection criteria inputs.

6. The method according to claim 1 further comprising determining if a relative correlation analysis is applicable, said converting comprising dividing values in said quantile-based workload data by an average value.

7. The method according to claim 1 wherein said correlation coefficient C, is computed as a normalization of a standard deviation as follows:

$$C = \frac{100}{N * \bar{x}} \sqrt{\sum_n^N (x_n - \bar{x})^2} \ ;$$

where $x_n$ is the $n^{th}$ data value instance; $\bar{x}$ is the average of the data values; and N is the number of data values.

8. The method according to claim 1 further comprising computing an overall correlation coefficient for multiple time samples as follows:

$$C = \frac{100}{T * N * \bar{x}} \sum_t^T \sqrt{\sum_n^N (x_{t,n} - \bar{x}_t)^2} \ ;$$

where: C is the correlation coefficient for the time period; N is the number of systems being analyzed; n is the $n^{th}$ system; $x_{t,n}$ is the data sample for the $n^{th}$ system at time sample t; $\bar{x}_t$ is the average data value for all the systems at time sample t; $\bar{x}$ is the overall average value for all the systems for all the time samples; T is the total number of time samples analyzed; and t is the $t^{th}$ time series data sample (e.g. 0, 1, 2, 3, . . . , 23).

9. The method according to claim 1 wherein correlation coefficients for multiple systems are computed for a set of statistics and multiple time sample such that for each time sample, the coefficients for multiple statistics are combined as a weighted average.

10. The method according to claim 9 wherein the correlation coefficient for a set of systems for multiple times samples and multiple statistics is computed as follows:

$$C = \frac{100}{T*N*\overline{x}} \sum_{t}^{T} \sum_{s}^{S} \left[ w_s * \sqrt{\sum_{n}^{N} (x_{t,s,n} - \overline{x}_{t,s})^2} \right];$$

where: C is the correlation coefficient; N is the number of systems being analyzed; T is the total number of time samples; S is the total number of statistical data values; $x_{t,s,n}$ is the data sample for the $n^{th}$ system for statistic s at time sample t; $\overline{x}_{t,s}$ is the average data value for the N systems for statistic s at time sample t; $\overline{x}$ is the overall average value for all the systems for all the statistics and time samples; $w_s$ is the weighting factor for combining the statistics; n is the $n^{th}$ system; s is the $s^{th}$ statistic data value; and t is the $t^{th}$ time series data sample.

11. The method according to claim 1 wherein said correlation scores are computed using a correlation coefficient limit.

12. The method according to claim 8 wherein said correlation scores are computed as follows:

$$S = 100 * \left(1 - \frac{C - L}{L}\right);$$

where: S is said correlation score; C is said correlation coefficient; and L is said coefficient limit.

13. The method according to claim 1, further comprising sorting said systems based on said correlation scores for organizing said correlation map.

14. The method according to claim 1 wherein results in said correlation map are presented in a grid wherein systems are listed as rows and columns and each cell in said grid comprise a number corresponding to a correlation score and is color coded to provide a visual indication of the extent of correlation and to facilitate sorting said correlation scores in said correlation map.

15. A computer readable medium comprising computer executable instructions for performing the method according to claim 1.

16. A system for estimating combined system workloads, said system comprising a database for storing workload data, said computer readable medium according to claim 15, and a processor for executing said computer executable instructions.

* * * * *